United States Patent
Maron

[11] 3,818,941
[45] June 25, 1974

[54] VALVE FOR HEATING SYSTEMS
[75] Inventor: Edmund Maron, Steinach, Switzerland
[73] Assignee: Aktiengesellschaft Adolph Saurer, Arbon, Switzerland
[22] Filed: May 4, 1972
[21] Appl. No.: 250,269

[30] Foreign Application Priority Data
May 6, 1971 Germany............................ 2122474

[52] U.S. Cl. .......................................... 137/625.4
[51] Int. Cl. ............................................. F16k 11/07
[58] Field of Search........ 137/625.4, 625.48, 614.17

[56] References Cited
UNITED STATES PATENTS

| | | | |
|---|---|---|---|
| 2,337,841 | 12/1943 | Shafer................... | 137/614.17 X |
| 2,982,300 | 5/1961 | Jackson et al. ............ | 137/614.17 X |
| 3,125,122 | 3/1964 | Bermingham.............. | 137/625.48 X |
| 3,366,328 | 1/1968 | Feinberg..................... | 137/625.4 X |
| 3,411,535 | 11/1968 | Rosaen ..................... | 137/614.17 X |
| 3,561,482 | 2/1971 | Taplin.............................. | 137/625.4 |
| 3,561,483 | 2/1971 | Taplin............................. | 137/625.4 |
| 3,595,474 | 7/1971 | Humpert.................... | 137/614.17 X |
| 3,626,966 | 12/1971 | Vanagas...................... | 137/625.4 X |

*Primary Examiner*—Henry T. Klinksiek
*Attorney, Agent, or Firm*—Michael S. Striker

[57] ABSTRACT

A valve has a first passage which is to communicate with the user, a second passage is to communicate with the source of hot fluid, and a third passage which is to communicate with a return flow conduit from the user to the source of hot fluid. Apertures connect the second and third passages with a chamber to admix hot fluid and cooler return fluid. Another aperture connects said chamber with the first passage. A single valve member is movable by an actuating member between a plurality of positions in which it permits only communication of the second passage with the chamber, of the third passage with the chamber, or of both of the second and third passages with the chamber, and in the latter instance, it varies the proportions of hot and cooler fluid returning from the user which pass from the second and third passages into the chamber as well as the throughput of the admixed fluid to the user.

9 Claims, 2 Drawing Figures

VALVE FOR HEATING SYSTEMS

BACKGROUND OF THE INVENTION

The present invention relates generally to a valve, and more particularly to a mixing valve which is especially suitable for use in heating systems.

Heating systems are known in which the amount of heat delivered to the user is determined either by controlling the throughput quantity of heating fluid while maintaining the temperature of the same constant, or else adjusting the temperature to the given requirements by maintaining the amount of throughput of fluid constant but admixing the incoming hot fluid derived from the source of hot fluid (e.g., a boiler) with a cooler fluid, for instance spent fluid which flows in a return circuit from the user. The present invention is concerned in particular with a valve for use in this type of heating system. In such systems there is encountered a problem of how to construct the mixing valves and the quantity regulating valves in such a manner as to obtain a desired stability in the heat regulation. The problem here involved is that the heat radiation of the heat carrier to the ambient areas which are to be heated is by no means even nearly a linear function of the throughput or of the mixing proportion of hot and cooler fluid. Rather, initially during rising heat requirement the heat yielded to the ambient spaces increases much more rapidly than the throughput quantities or the increasing proportion in the mixture of hot with cooler fluid, and the heat radiation increases only gradually until a maximum level of heat radiation is reached. The problem thus far has been solved, or it has been attempted to solve it, by accommodating the characteristic line of the regulating valve to the characteristic of heat radiation of the user, by appropriately profiling the valve member controlling the operation of the valve in dependence upon the displacement of the valve member. However, this has a disadvantage in that valves of this type have a relatively long adjusting range. For instance, in lift-type valves, the valve member must be lifted by a distance corresponding to at least 50 percent of the valve diameter, meaning that if the valve diameter is for instance 25 mm., the valve member must be shifted in its regulating path by distances of 13 – 14 mm. In many instances this is disadvantageous because of the time involved.

It has been suggested to vary simultaneously both the throughput quantity and the temperature of the incoming heating fluid in order to thereby obtain smaller valve member paths. The variations in the temperature are to be made dependent upon those of the throughput quantity, in that at least a portion of the throughput quantity dependent pressure which exists in the incoming side of the valve is used fo controlling or operating the device which admixes cooler fluid with the incoming hot fluid. However, it is evident that such a control requires rather expensive and complicated constructions, making such valves expensive and liable to malfunction, aside from the fact that such constructions are highly sensitive to pressure fluctuations.

SUMMARY OF THE INVENTION

Accordingly, it is a general object of the present invention to avoid the disadvantages of the prior art.

More particularly, it is an object of the invention to provide an improved valve which avoids these disadvantages.

Another object of the invention is to provide such an improved valve which is simple, requires small displacements of its valve members for the regulating function, and permits to a significant extent linearization of the heat radiation to the ambient areas as a function of the displacement of the valve member.

In pursuance of these objects and of others which will become apparent hereafter one feature of the invention resides in a mix valve for use in a heating system, which valve briefly stated comprises a first passage adapted to communicate with a user, a second passage adapted to communicate with a source of hot fluid, and a third passage adapted to communicate with a return flow conduit from the user to the source of hot fluid. Aperture means connects the second and third passages with a mixing chamber, and connects the mixing chamber with the first passage. A single valve member is movable by an actuating member between a plurality of positions in which it permits only communication of the second passage with the mixing chamber, of the third passage with the mixing chamber, or of the mixing chamber with the first passage, and in the latter instance varies the proportions of hot and cooler fluid passing from the second and third passages into the mixing chamber as well as the throughput of the admixed fluid to the user.

According to a further concept of the invention, the variations in the effective flow-through cross sections of the various apertures are advantageously made proportional to the displacement of the regulating member, because this results in a construction of great simplicity of the valve members.

If the flow through cross section of the aperture connecting the mixing chamber with the first passage can be reduced to about 25 percent of its greatest or maximum value, and the novel valve is so constructed that the maximum flow-through cross-section of the aperture connecting the third passage with the mixing chamber so as to admix with the incoming hot fluid the cooler fluid, from the return flow conduit is approximately twice as great as the greatest flow-through cross section of the aperture connecting the second passage with the mixing chamber, such a valve will comply with a basic condition to obtain the desired linearity.

It is further important according to the present invention that the flow-through cross-sections of the apertures connecting the mixing chamber with the first passage and the second passage with the mixing chamber be variable in the same sense.

According to a further concept of the invention, at least two proportionality factors are operative for varying the flow-through cross-section of the aperture connecting the second passage with the mixing chamber, while within the range within which the valve member can provide for such variation. This makes it possible, always maintaining the proportionality of flow-through cross-section and adjusting range, to select within a certain limit the mixing ratio of cooler spent fluid to the hot fluid.

If the percentage variation of the flow through cross-section based upon the position of the valve member for closing the aperture connecting the second passage with the mixing chamber is between 0.40 and 0.75 times the percentage displacement of the valve member, and the percentage variation of the flow through cross-section based upon the position of the valve member for the greatest flow through cross-section of the aperture connecting the second passage with the mixing chamber is between 1.3 and 4 times that of the percentage displacement of the valve member, then a mixing and quantity regulating valve is obtained which particularly complies with the desired linearity. Such a valve has characteristics which will be described hereafter in detail with reference to the exemplary illustrated embodiment.

It will be appreciated that the valve according to the present invention may be of various different types, for instance of the rotary valve member type, the sliding valve member type, or the lifting valve member type, however, the latter is most advantageous, especially when the valve is combined to a single piece with a valve sleeve for varying the flow through cross-sections of the apertures connecting the second and third passages with the mixing chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
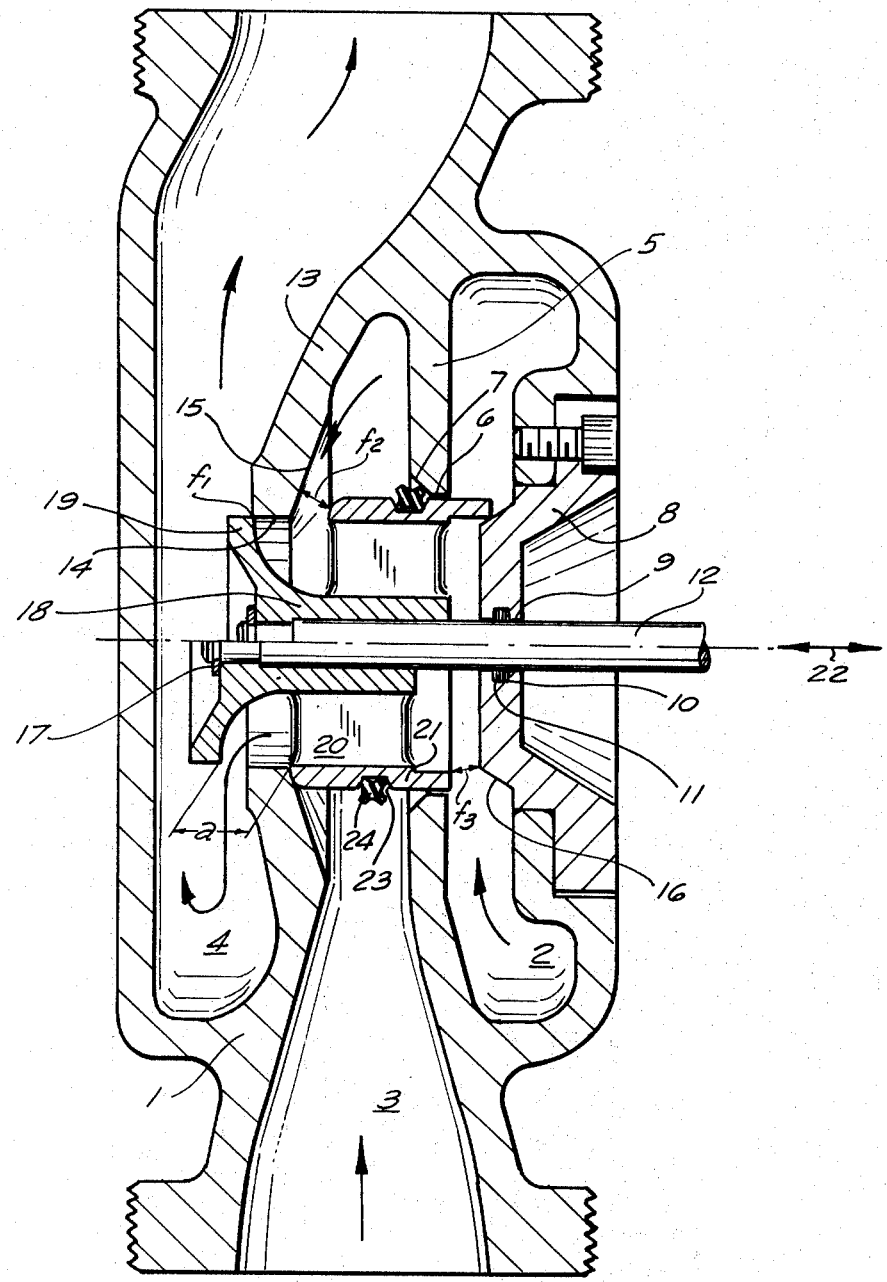
FIG. 1 is a longitudinal section illustrating one embodiment of the invention, the upper half of FIG. 1 showing the valve member in one extreme position and the lower half showing the valve member in the opposite extreme or end position.

Discussing now the drawing in detail and firstly the structural illustration in FIG. 1, there will be seen that the novel valve which is illustrated by way of example therein has a valve housing 1 provided with a passage 2 which is to be connected with a source of hot fluid, that is for instance a boiler. A passage 3 is to be connected with a return flow conduit from which spent or cooled fluid is returned from the user to the source of hot fluid. A passage 4 communicates with the user, that is it is to be connected with a conduit which conducts heating fluid to the user, for instance a radiator.

A wall 5 separates the passage 2 from the passage 3 and is provided with a central aperture 6 having a conical passage portion 7 at the side facing the passage 3. A removable cover 8 is provided closing the passage 2 with respect to the exterior; the cover 8 has a substantially conical centric projection 16 formed with a central opening 9 through which an actuating rod 12 passes which is axially displaceable in the direction of the double-headed arrow 22. The opening is sealed with respect to the rod 12 by being provided with an inner circumferential annular recess 10 in which a sealing ring 11 is accommodated which engages the rod 12.

A further aperture 14 is centrally located in a wall 13 which separates the passage 3 from the passage 4; a conical projection or portion 15 is provided at the side of the passage 3, with which portion the aperture 14 merges.

A valve body 18 is mounted on the rod 12, retained against axial displacement in relation thereto in suitable manner, for instance by a circlip 17. The valve body 18 is in essence comprises a plate-shaped front portion 19, and spaced axially therefrom by a distance $a$ from the rear edge of the same, a sleeve 21 which is connected with the portion 19 by means of webs or wings 20. The valve body 18 is axially displaceable when the rod 12 is displaced, which displacement in the direction of the double-headed arrow 22, can be effected by suitable means that is for instance an actuating member located exteriorly of the valve housing and not illustrated because they do not form a part of the invention. Such means may be thermomechanically or thermoelectrically or otherwise controlled drives which are known to those skilled in the art.

Attention is directed to the fact that the portion 19 has an outer diameter which is smaller than or at most equal to, the diameter of the aperture 14 in the wall 13, whereas the sleeve 21 has an outer diameter which is smaller than, or at most equal to, the diameter of the aperture 6 in the wall 5; however, the sleeve 21 must have an outer diameter which is greater than the diameter of the aperture 14. A sealing ring 24, for instance of the four-sealing lip type as shown, is provided in the sleeve 21, being accommodated in an outer circumferential groove 23 therein.

A description of the operation of the novel mix valve will now follow.

If heat is not required by the user, then the rod 12 is so displaced by the non-illustrated drive (which may be thermostatically controlled as already mentioned above), that it moves to the one extreme position illustrated in the upper half of FIG. 1. In this position, the portion 19 closes the opening 14 except for a flow through cross-section $f_1$ min., which is obtained by appropriate dimensioning. The sleeve 21 abuts with its side facing away from the portion 19 in sealing engagement against the projection 16, and the sealing ring 24 engages the portion 7 of the wall 5. This means that any passage of hot fluid is prevented ($f_3 = 0$).

However, it should be noted that the end of the sleeve 21 which faces the portion 19 defines between itself and the conical portion 15 in the wall 13 the maximum flow through cross section $f_2$ max., so that cooler fluid returning from the user to the source of hot fluid, can pass from the passage 3 via the cross section $f_1$ and the cross section $f_2$ max. into the passage 4 and from there to the user.

If maximum heat is called for, the rod 12 assumes another extreme position shown in the lower half of FIG. 1, in which the portion 19 and the end of the sleeve 21 facing away from the portion 19 expose the complete cross section of the aperture 14 and the maximum flow through cross section $f_3$ max. between the aforementioned end of the sleeve 21 and the projection 16 in cover 8. The opposite end of the sleeve 21, that is the one facing towards the portion 19, contacts the conical projection in the wall 13 and prevents entirely any flow of cooler fluid from the passage 3. Only hot fluid from the passage 2 in the full incoming amount can pass from the passage 2 through the flow-through cross-section $f_3$ and the aperture 14 (flow-through cross section $f_1$) into the passage 4 and from there to the user.

It is evident, of course, that no heating system operates only in the two extreme operational modes exemplified in the upper and lower halves of FIG. 1. In conditions intermediate to these two extreme modes, the quantity of hot fluid which passes into the passage 4 varies in dependence upon the flow-through cross section $f_1$ which is determined by the relative position of portion 19 of the valve 18 to the aperture 19. Heat radiation by the radiator to the ambient spaces would take place, which would be more than proportional to the quantity of incoming hot fluid, if it were not for the fact that the temperature of the incoming hot fluid is reduced by admixing an amount of cooler fluid in a ratio determined in first approximation in accordance with the flow-through cross section ratios $f_2:f_3$ controlled by the position of the ends of the sleeve 21. By appropriately determining the relationship min. to max. of quantity of fluid, as well as the relation $f_2/f_3$ of the flow-through cross-sections controlling the ratio of the hot fluid and the cooler fluid, the heat radiation can be made largely proportional to the displacement of the valve member, in other words, it can be linearized thus obtaining the advantage that a profiling of the valve member with the resultant large displacement path of the same is no longer necessary.

Studies have been conducted showing that a good relationship exists if the smallest flow-through cross-section $f_1$ min. equals to at most 50 percent and preferably not more than 35 percent particularly about 25 percent of the maximum flow through cross section $f_1$ max., and if the maximum flow-through cross-section $f_2$ max. for the cooler return fluid which is to be mixed with the hot fluid is approximately twice as great as the maximum flow through cross section $f_3$ max. for the incoming hot fluid.

It is desirable to construct the sleeve 21 relatively thin-walled so as to keep down its weight. To achieve this the relationship $f_2$ max./$f_3$ max. should advantageously be determined by appropriate selection of the cone angles on the portions 15 and 16 with which the ends of the sleeve 21 cooperate.

I have found that a linear variation of the flow-through cross-section $f_3$ for the hot fluid over the entire adjusting range of the valve member 18, and similarly linear variation of the flow-through cross-section $f_1$ for the mixture of hot and cooler fluid, result in a characteristic line of heat radiation as a function of the displacement of the valve member, which characteristic line deposit being subject to hydrodynamic interferences, is nevertheless usable for heating systems where the requirements of regulation are not too high. However, a better result is obtained in terms of the linearity of heat radiation as a function of the displacement of the valve member if the adjusting range of the valve member is separated or subdivided into at least two partial regions, whereby the variation of the flow-through cross-section $f_3$ for the hot fluid is linear in each region for any displacement of the valve member. This means that when the flow-through cross-section $f_3$ opens, starting from the closed position of the aperture 14 (i (3 = 0), the percentual variation of the cross section related to the maximum cross-section $f_3$ max. amounts to between 0.40 and 0.75 percent of the percentual valve member displacement related to the total displacement of the valve member. As the value member approaches the position for the maximum flow through cross-section $f_3$ max., the percentual cross-sectional variation $f_3/f_3$ max. amounts to between 1.3 and 4 times the percentual displacement of the valve member, always keeping in mind that the variation of the flow through cross section is linear for the mixture over the entire regulating range.

Figure 2:
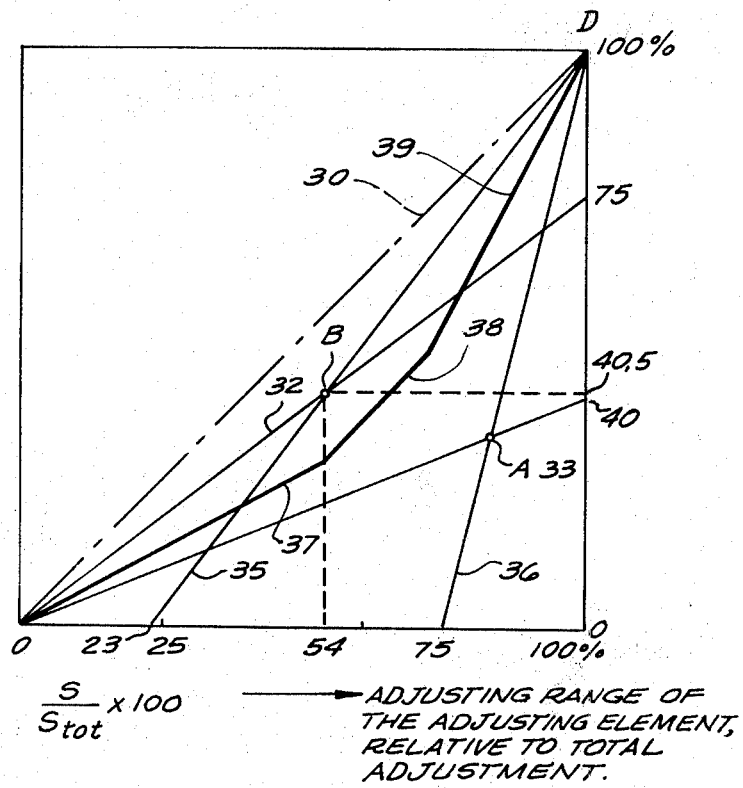
FIG. 2 is a diagram showing the flow through cross sectional relationship $f3/f3$ max. with respect to the adjusting range of the valve in FIG. 1.

Coming now to FIG. 2 it will be seen that in this diagram these relationships are clearly shown. The abscissa indicates the adjusting or displacement range of the valve member related to the total displacement of the latter and the ordinate illustrates the flow-through cross-section $f_3$ related to the maximum flow-through cross-section $f_3$ max. in percentages. The line 30 designates the dependence of the flow-through cross-section $f_3$ corresponding to a valve construction in which the cross-sectional variation is a linear function of the displacement over the entire adjusting range of the valve member. Percentage-wise cross-sectional variations and percentage-wise displacement of the valve member are identical, so that a direct proportionality is obtained.

The lines 32 and 35 designate a construction in which the cross-sections are initially changed up to a point approximately corresponding to 54 percent of the percentual displacement of the valve member. The line 32 indicates the percentual cross-sectional variation as being only 0.75 times the percentual variation of the displacement of the valve member; this means that a point corresponding to up to 54 percent of the displacement of the valve member only 40.5 percent of the maximum flow-through cross section $f_3$ max. for the hot fluid is open (point B). Therefore, for the remaining partial displacement or range of the valve member, the cross-sections must vary by a larger percentage than the corresponding percentual displacement of the valve member. The line 35 indicates that along this line the percentage-wise cross-sectional variation amounts to 1.3 times (100 : 77) the percentage of the valve member displacement, meaning that during the residual approximately 46 percent of the displacement of the valve member (related to 100 percent of the displacement), the flow-through cross section increases by 59.5 percent of the maximum value $f_3$ max.

The dependency indicated by the lines 33 and 36 corresponding to an analogous valve construction as previously described except that the rate of growth of the exposure of the flow-through cross sections along the line 33 is 0.40 and along the line 36, four times the percentage of the displacement of the valve member.

Each of the lines indicated in the area A,D,B,D which is delimited by the lines 32, 33, 35 and 36, represents a dependency of the cross-sectional variations upon the displacement of the valve member, such as for instance the ones indicated by the lines 37, 38 and 39 which designate a valve construction wherein the requirement of linearity of heat radiation can be particularly well fullfilled in dependence upon the displacement of the valve member.

It will be appreciated that in this manner, the desired linear behavior of the heat radiation can be achieved without requiring complicated valve or valve seat configurations and without having to resort to long valve member travel path. This can for instance be obtained in the exemplary valve shown in FIG. 1, by giving the portion 16 a multiple conical configuration, for instance a double-conical configuration.

It will be understood that each of the elements described above, or two or more together, may also find a useful application in other types of constructions differing from the types described above.

While the invention has been illustrated and described as embodied in a valve, it is not intended to be limited to the details shown, since various modifications and structural changes may be made without departing in any way from the spirit of the present invention.

Without further analysis, the foregoing will so fully reveal the gist of the present invention, that others can, by applying current knowledge, readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A mixing valve for use in a heating system, comprising a first passage adapted to communicate with a user; a second passage adapted to communicate with a source of hot fluid; a third passage adapted to communicate with a source of cooler fluid; aperture means connecting said second and third passages with a mixing chamber to admix hot fluid and cooler return fluid and connecting said mixing chamber with said first passage; and a single valve member movable by an actuating member between a plurality of positions in which it permits only communication via said mixing chamber of said second passage with said first passage, of said third passage with said first passage, or both of said second and third passages with said first passage, and in the latter instance permitting variations of the proportions of hot and cooler fluid passing from said second and third passages into said mixing chamber to be admixed therein, as well as of the quantity of said admixed fluid passing to the user.

2. A valve as defined in claim 1, wherein said valve member controls the effective flow-through cross-sections of said aperture means.

3. A valve as defined in claim 2, wherein said valve member is operative for varying the effective flow-through cross section of the aperture means connecting said mixing chamber with said first passage between substantially 25 and 100 percent.

4. A valve as defined in claim 3, wherein said valve member is operative for varying the effective flow-through cross-section of the aperture means connecting said second and said third passages with said mixing chamber proportionally to that of the aperture means connecting said mixing chamber with said first passage, and wherein the maximum flow-through cross-section of the aperture means connecting the third passage with said mixing chamber is equal to substantially double the maximum flow-through cross-section of the aperture means connecting the second passage with said mixing chamber.

5. A valve as defined in claim 4, said valve member comprising a valve sleeve operative for varying said effective flow-through cross-sections of the aperture means connecting said second and third passages with said mixing chamber.

6. A valve as defined in claim 5, said valve sleeve having opposite end portions provided with conically tapering sealing surfaces.

7. A valve as defined in claim 2, wherein said valve member controls said effective flow-through cross-sections proportionally to movements of said valve member.

8. A valve as defined in claim 7, wherein the percentage change in said flow-through cross-section of said aperture means connecting said mixing chamber with said second passage, starting from a fully closed position, is between 0.40 – 0.75 times the percentage displacement required of said valve member to obtain said change from said fully closed position; and the percentage change in said flow-through cross-section of said aperture means connecting said mixing chamber with said second passage, starting from a fully open position, is between 1.3 – 4 times the percentage displacement required of said valve member to obtain said change from said fully open position.

9. A mixing valve for use in a heating system, comprising a first passage adapted to communicate with a user; a second passage adapted to communicate with a source of hot fluid; a third passage adapted to communicate with a cool fluid return flow conduit connecting said user with said source of hot fluid; a mixing chamber; first aperture means connecting said second and third passages with said mixing chamber; second aperture means connecting said mixing chamber with said first passage; and single valve member means movable relative to said aperture means between a first end position permitting only communication of said first and second passages with said mixing chamber so that said first passage receives only hot fluid, a second end position permitting only communication of said first and third passages with said mixing chamber so that said first passage receives only cool fluid, and a plurality of intermediate positions between said end positions in each of which said valve member means permits communication of all of said passages with said mixing chamber so that said first passage receives both hot and cool fluid in a quantity and at a mixing ratio which depend upon the proximity of said valve member means in the respective intermediate position to one of said end positions, said valve member means varying the effective flow-through cross-section of said first aperture means proportionally to a corresponding variation in the effective flow-through cross-section of said second aperture means.

* * * * *